Figure 3:
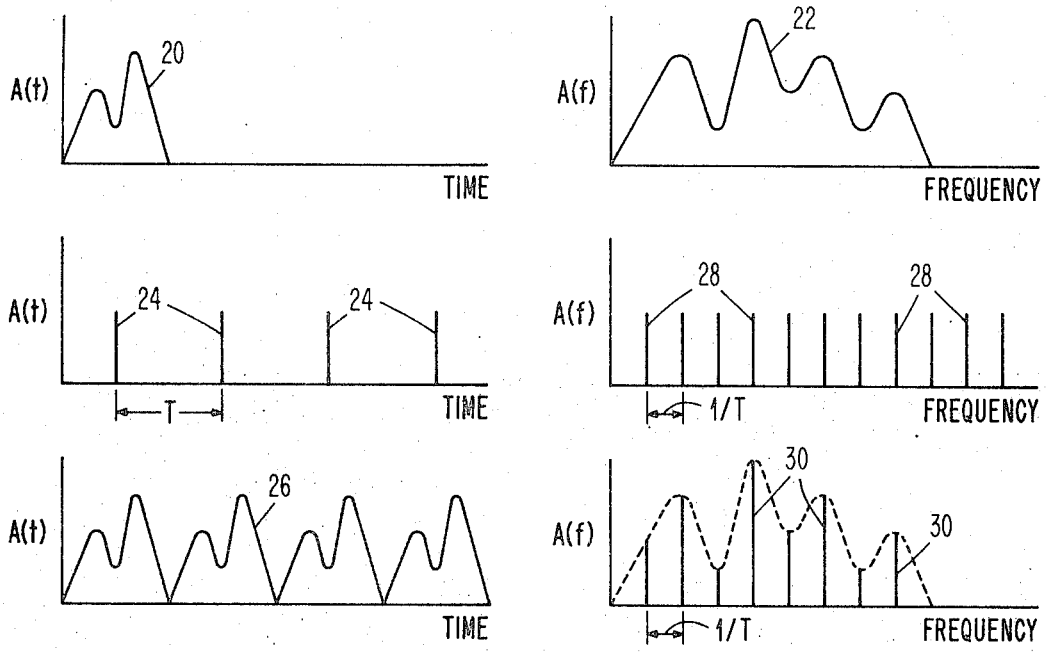
Figure 12B:
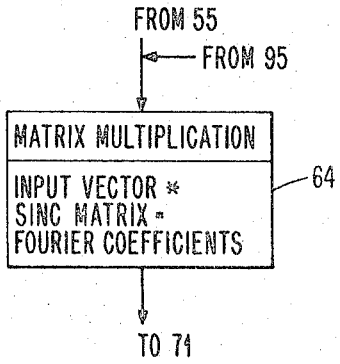
Figure 12C:
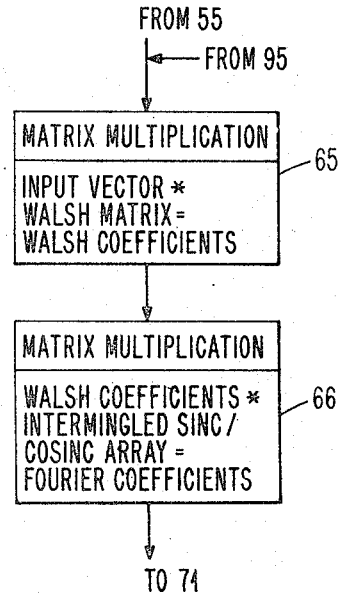
Figure 4:
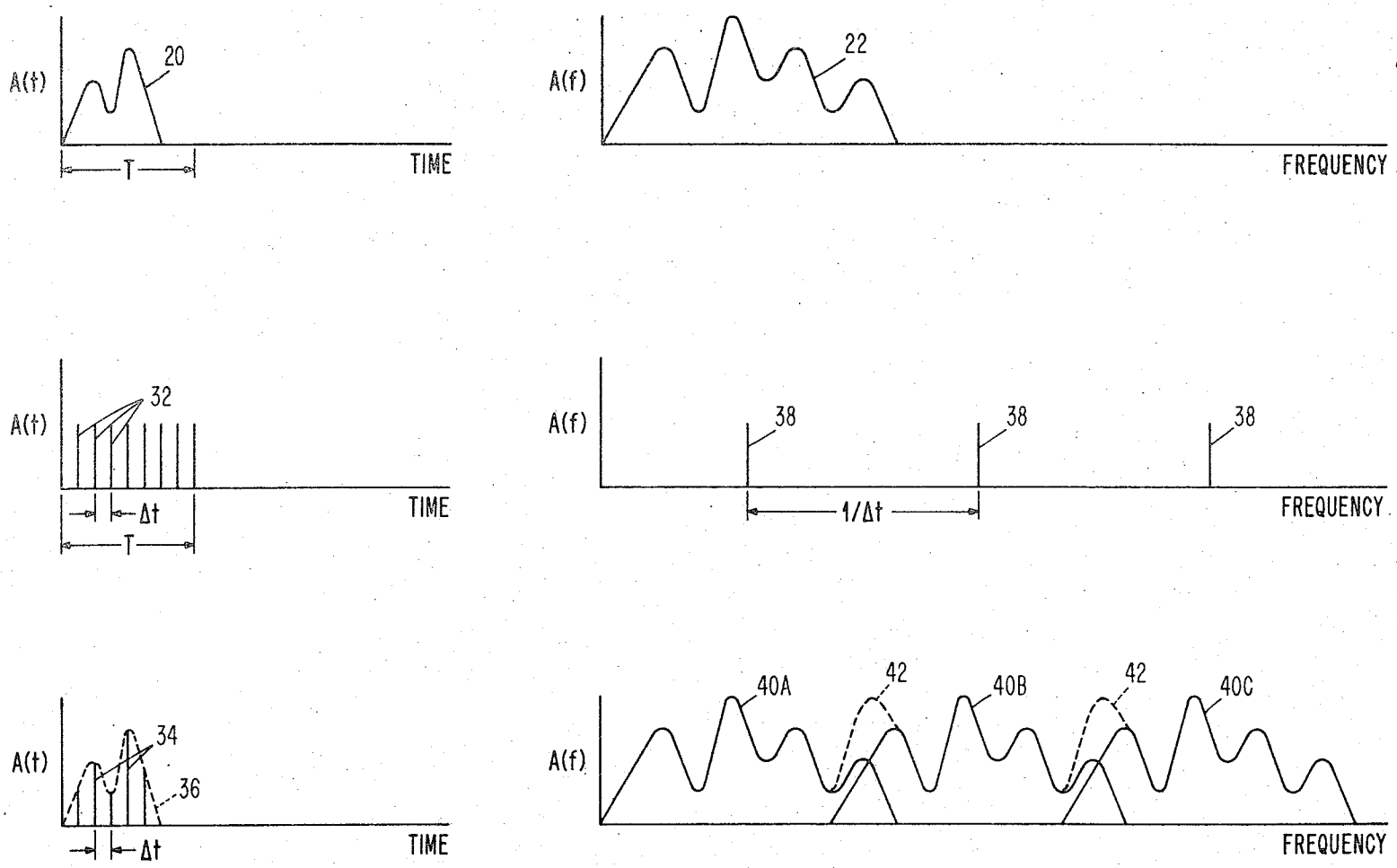
Figures 5A, 5B:
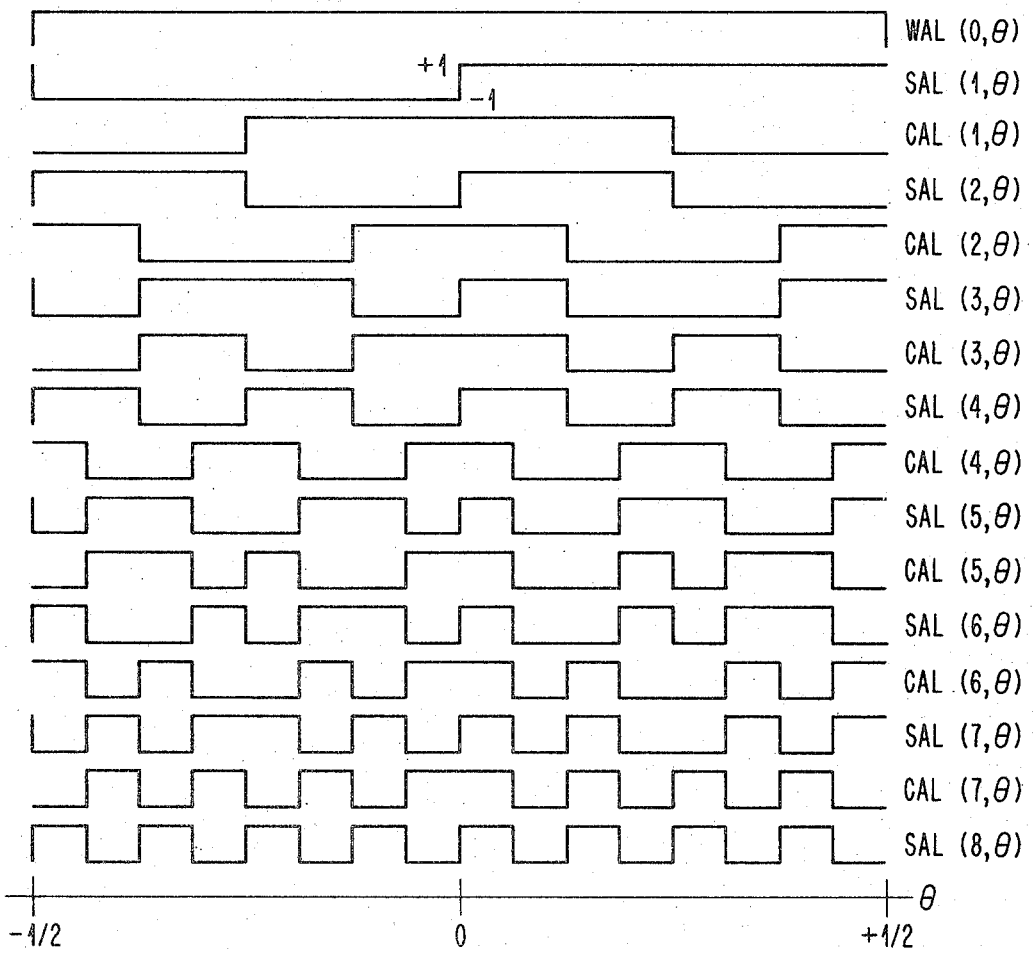
Figure 12A:
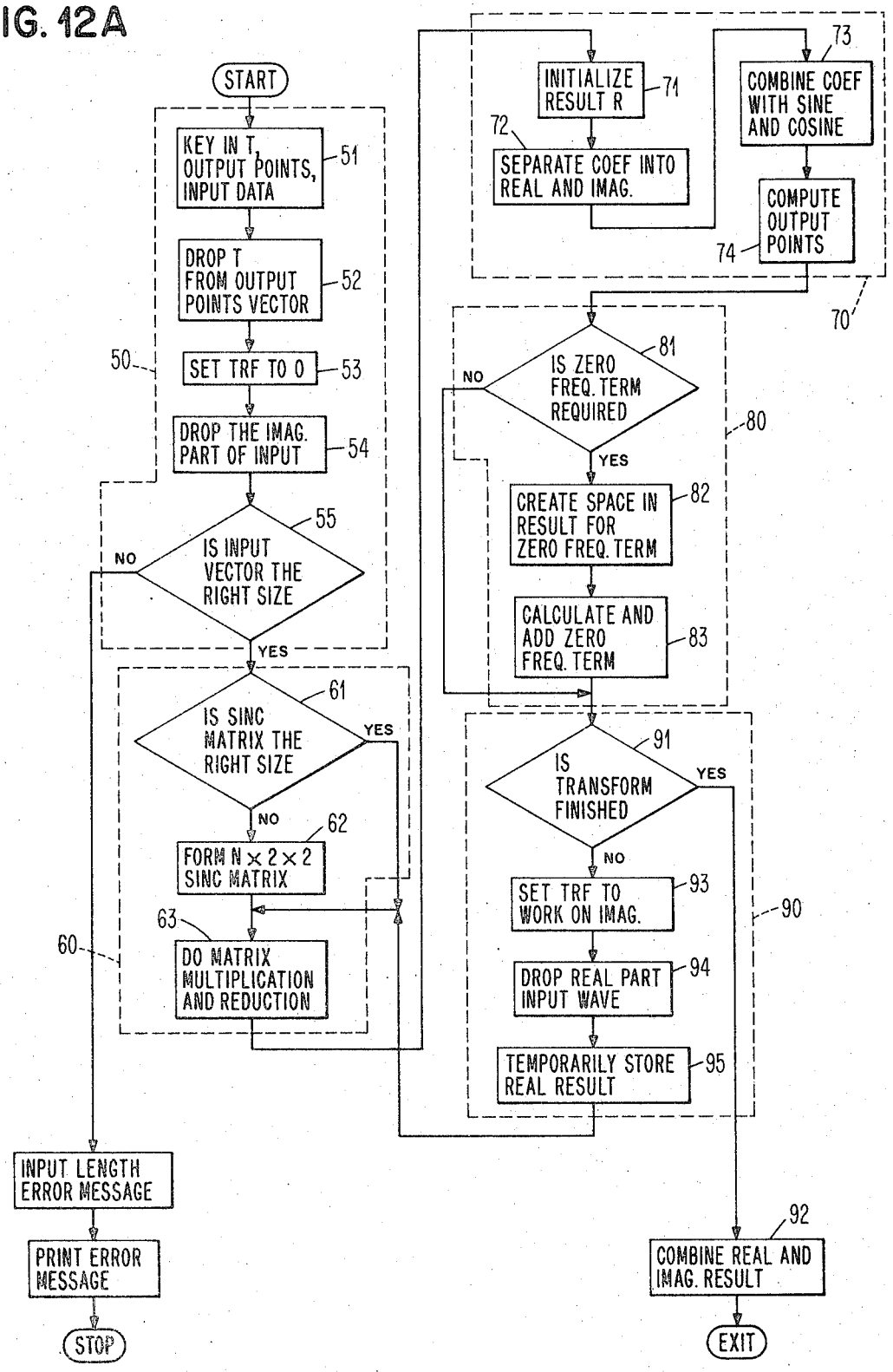
Figure 15B:
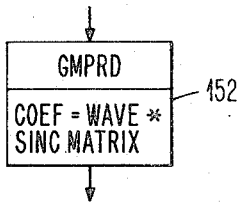
Figure 15C:
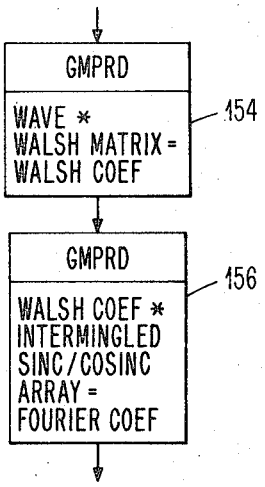
Figure 15D:
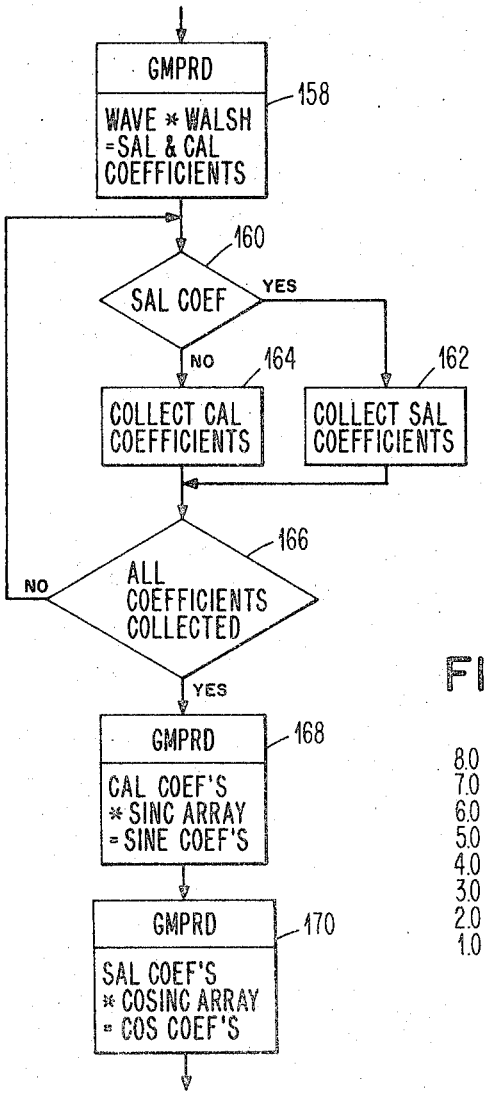
Figure 13:
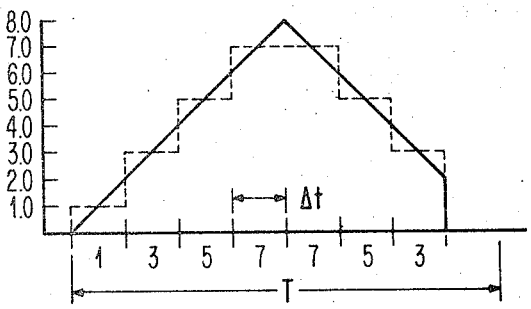
Figure 14A:
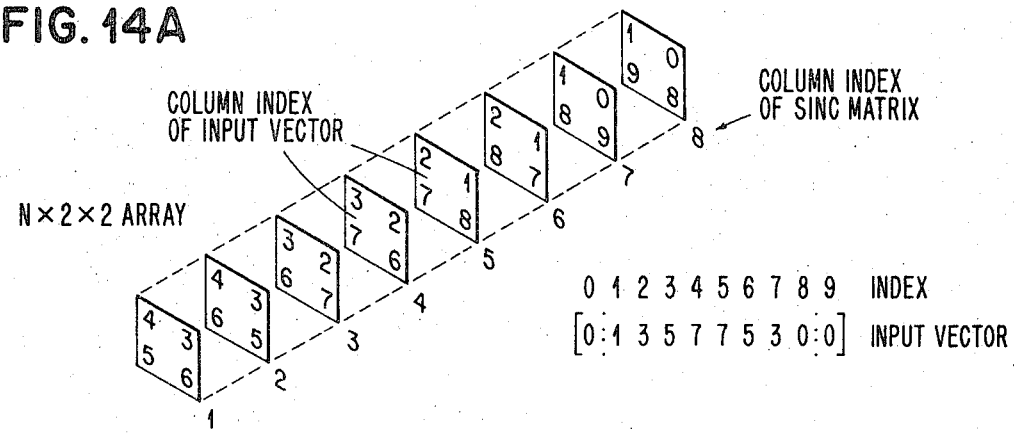
Figure 14B:
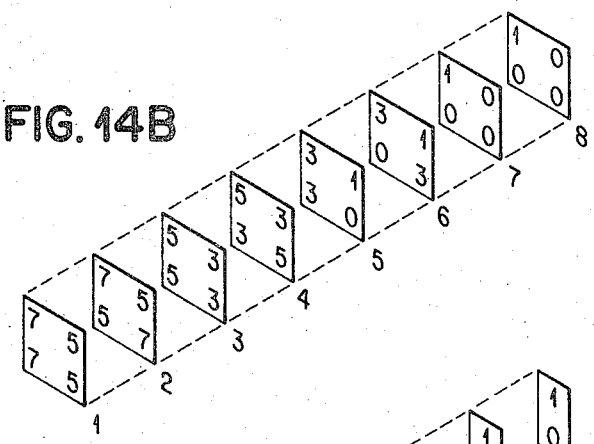
Figure 14C:
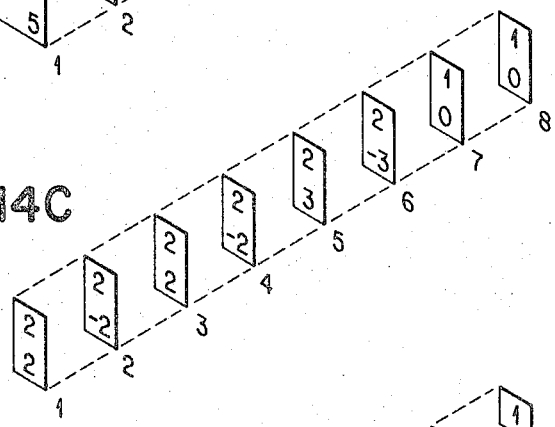
Figure 14D:
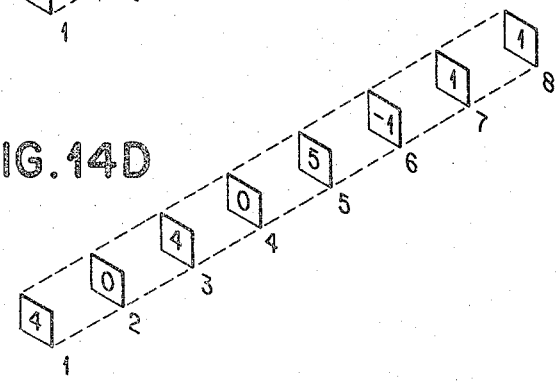
Figure 15A:
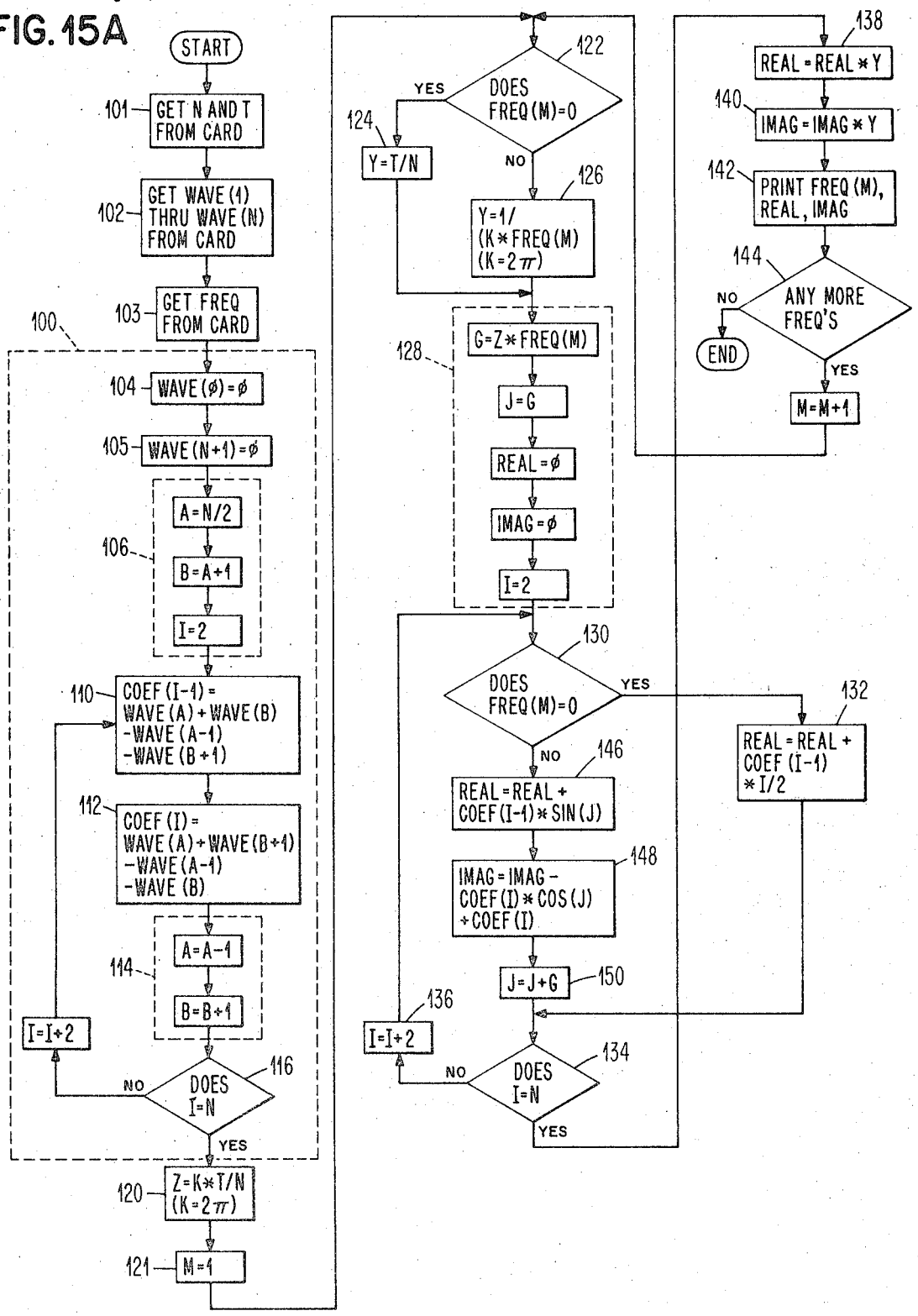

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 8, 1973

910 O.G. 408

T910,009

SINC/COSINC TRANSFORM—A CONTINUOUS FOURIER TRANSFORM

Robert F. Abramson, Arvada, Colo., assignor to International Business Machines Corporation, Armonk, N.Y.

Filed July 3, 1972, Ser. No. 268,334
Int. Cl. G06f *7/38, 15/34*
U.S. Cl. 444—1
10 Sheets Drawing. 57 Pages Specification

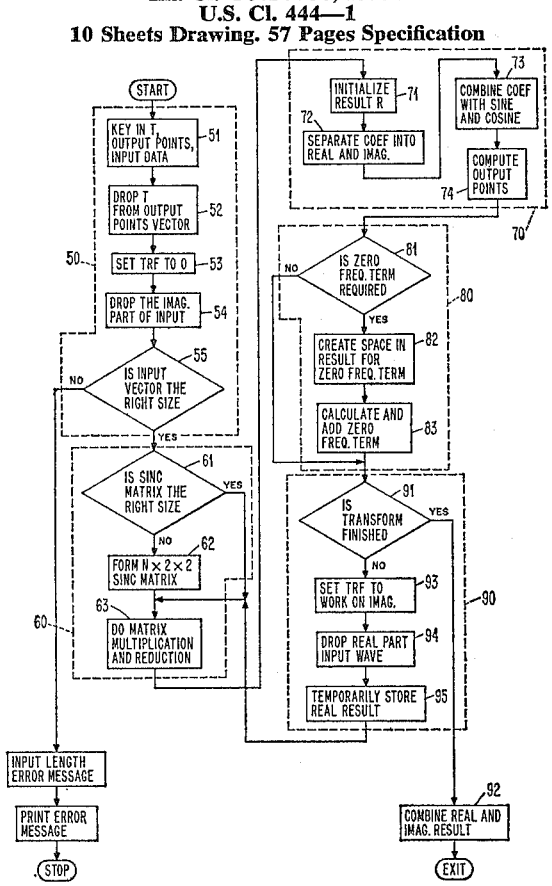

The Fourier transform of a non-periodic wave is calculated by programmed computer using matrix multiplication. The non-periodic wave to be transformed is converted to a staircase waveform where the amplitude of each step in the staircase waveform is the average amplitude of the original wave. Walsh coefficients of the staircase waveform are then computed by matrix multiplication of the Walsh matrix times sample values for the wave where the sample values are the various amplitudes of the staircase wave during separate step or sample intervals. Thereafter, the continuous Fourier transform of a non-periodic wave is calculated by computing the Fourier transform of the Walsh functions. The latter computation is simplified by multiplying the Walsh coefficients by a sinc array and a cosinc (defined hereinafter) array. A further and ultimate simplification of the entire process is accomplished by multiplying the Walsh matrix by an intermingling of the sinc and cosinc arrays. The result is a matrix consisting mostly of zeroes and hereinafter defined as the sinc matrix. Multiplication of the input wave values by the sinc matrix will yield directly sine/cosine coefficients of the Fourier sine/cosine transforms for the staircase waveform that simulates the input wave. With the coefficients of the Fourier sine/cosine transforms defined, the Fourier transform at any frequency may be computed.

SINC/COSINC TRANSFORM — A CONTINUOUS FOURIER TRANSFORM
Filed July 3, 1972 10 Sheets-Sheet 1
FIG. 1A
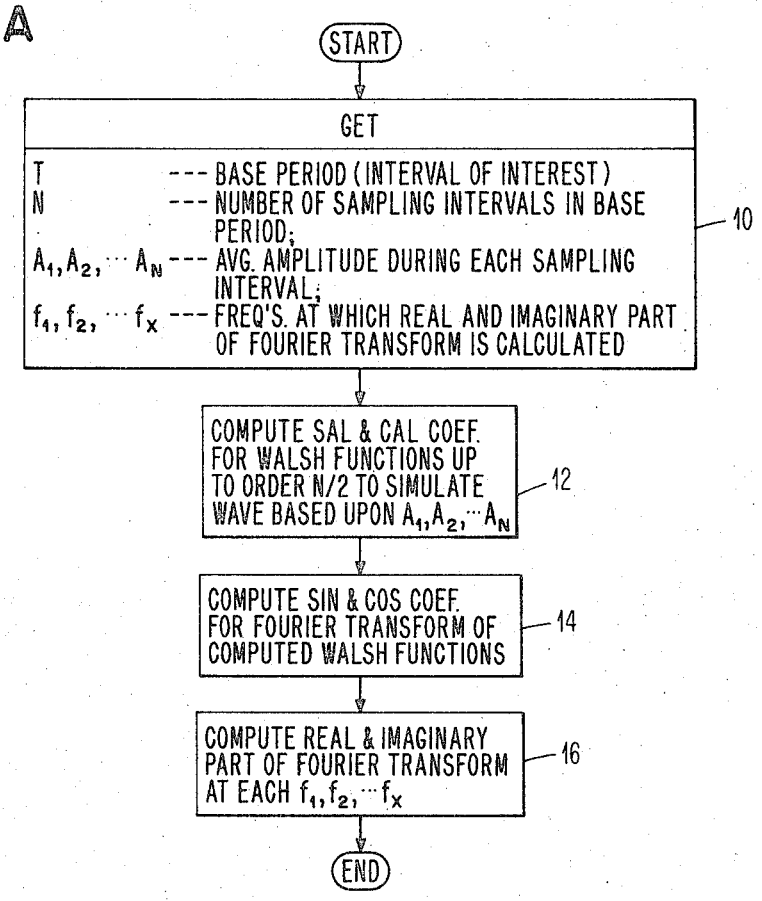
FIG. 1B
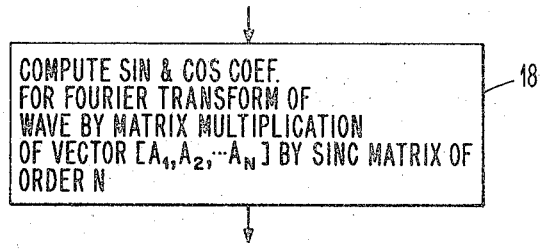
FIG. 2
$$\begin{bmatrix} & & & & & & - & - & + & + \\ & & & & & - & - & + & + & \\ & & & & - & - & + & + & & \\ & & & + & + & & & & & \\ & & & + & - & & & & & \\ & & - & + & + & - & & & & \\ & & & & - & + & + & - & & \\ & & & & & & - & + & + & - \end{bmatrix}$$
SINC MATRIX

SINC/COSINC TRANSFORM — A CONTINUOUS FOURIER TRANSFORM

Filed July 3, 1972 10 Sheets-Sheet 3

WALSH MATRIX

| | | | | | | | | | | | | | | | |
|---|---|---|---|---|---|---|---|---|---|---|---|---|---|---|---|
| + | − | − | + | + | − | − | + | + | − | − | + | + | − | − | + |
| + | − | − | + | + | − | − | + | − | + | + | − | − | + | + | − |
| + | − | − | + | − | + | + | − | − | + | + | − | + | − | − | + |
| + | − | − | + | − | + | + | − | + | − | − | + | − | + | + | − |
| + | − | + | − | − | + | − | + | + | − | + | − | − | + | − | + |
| + | − | + | − | − | + | − | + | − | + | − | + | + | − | + | − |
| + | − | + | − | + | − | + | − | − | + | − | + | − | + | − | + |
| + | − | + | − | + | − | + | − | + | − | + | − | + | − | + | − |
| + | + | + | + | + | + | + | + | + | + | + | + | + | + | + | + |
| + | + | + | + | + | + | + | + | − | − | − | − | − | − | − | − |
| + | + | + | + | − | − | − | − | − | − | − | − | + | + | + | + |
| + | + | + | + | − | − | − | − | + | + | + | + | − | − | − | − |
| + | + | − | − | − | − | + | + | + | + | − | − | − | − | + | + |
| + | + | − | − | − | − | + | + | − | − | + | + | + | + | − | − |
| + | + | − | − | + | + | − | − | − | − | + | + | − | − | + | + |
| + | + | − | − | + | + | − | − | + | + | − | − | + | + | − | − |

FIG. 6

COSINE TRANSFORM $$a(c0)=\frac{1}{\pi f}\left[\mathrm{SIN}\left(\pi f\frac{8T}{8}\right)\right]$$

$$a(c1)=\frac{1}{\pi f}\left[2\,\mathrm{SIN}\left(\pi f\frac{4T}{8}\right)-\mathrm{SIN}\left(\pi f\frac{8T}{8}\right)\right]$$

$$a(c2)=\frac{1}{\pi f}\left[2\,\mathrm{SIN}\left(\pi f\frac{2T}{8}\right)-2\,\mathrm{SIN}\left(\pi f\frac{6T}{8}\right)+\mathrm{SIN}\left(\pi f\frac{8T}{8}\right)\right]$$

$$a(c3)=\frac{1}{\pi f}\left[2\,\mathrm{SIN}\left(\pi f\frac{2T}{8}\right)-2\,\mathrm{SIN}\left(\pi f\frac{4T}{8}\right)+2\,\mathrm{SIN}\left(\pi f\frac{6T}{8}\right)-\mathrm{SIN}\left(\pi f\frac{8T}{8}\right)\right]$$

$$a(c4)=\frac{1}{\pi f}\left[2\,\mathrm{SIN}\left(\pi f\frac{T}{8}\right)-2\,\mathrm{SIN}\left(\pi f\frac{3T}{8}\right)+2\,\mathrm{SIN}\left(\pi f\frac{5T}{8}\right)-2\,\mathrm{SIN}\left(\pi f\frac{7T}{8}\right)+\mathrm{SIN}\left(\pi f\frac{8T}{8}\right)\right]$$

$$a(c5)=\frac{1}{\pi f}\left[2\,\mathrm{SIN}\left(\pi f\frac{T}{8}\right)-2\,\mathrm{SIN}\left(\pi f\frac{3T}{8}\right)+2\,\mathrm{SIN}\left(\pi f\frac{4T}{8}\right)-2\,\mathrm{SIN}\left(\pi f\frac{5T}{8}\right)+2\,\mathrm{SIN}\left(\pi f\frac{7T}{8}\right)-\mathrm{SIN}\left(\pi f\frac{8T}{8}\right)\right]$$

$$a(c6)=\frac{1}{\pi f}\left[2\,\mathrm{SIN}\left(\pi f\frac{T}{8}\right)-2\,\mathrm{SIN}\left(\pi f\frac{2T}{8}\right)+2\,\mathrm{SIN}\left(\pi f\frac{3T}{8}\right)-2\,\mathrm{SIN}\left(\pi f\frac{5T}{8}\right)+2\,\mathrm{SIN}\left(\pi f\frac{6T}{8}\right)-2\,\mathrm{SIN}\left(\pi f\frac{7T}{8}\right)+\mathrm{SIN}\left(\pi f\frac{8T}{8}\right)\right]$$

$$a(c7)=\frac{1}{\pi f}\left[2\,\mathrm{SIN}\left(\pi f\frac{T}{8}\right)-2\,\mathrm{SIN}\left(\pi f\frac{2T}{8}\right)+2\,\mathrm{SIN}\left(\pi f\frac{3T}{8}\right)-2\,\mathrm{SIN}\left(\pi f\frac{4T}{8}\right)+2\,\mathrm{SIN}\left(\pi f\frac{5T}{8}\right)\right.$$
$$\left.-2\,\mathrm{SIN}\left(\pi f\frac{6T}{8}\right)+2\,\mathrm{SIN}\left(\pi f\frac{7T}{8}\right)-\mathrm{SIN}\left(\pi f\frac{8T}{8}\right)\right]$$

FIG. 8

SINC ARRAY

| | | | | | | | |
|---|---|---|---|---|---|---|---|
| | | | | | | | 1 |
| | | | 2 | | | | -1 |
| | 2 | | | | -2 | | 1 |
| | 2 | | -2 | | 2 | | -1 |
| 2 | | -2 | | 2 | | -2 | 1 |
| 2 | | -2 | 2 | -2 | | 2 | -1 |
| 2 | -2 | 2 | | -2 | 2 | -2 | 1 |
| 2 | -2 | 2 | -2 | 2 | -2 | 2 | -1 |

FIG. 10

INTERMINGLED SINC AND COSINC $$\begin{bmatrix}
 & & & & & & & 1 \\
 & & & & & & & -1 \\
 & & & 2 & & & & -1 \\
 & & & -2 & & & & 1 \\
 & 2 & & & & -2 & & 1 \\
 & -2 & & & & 2 & & -1 \\
 & 2 & & -2 & & 2 & & -1 \\
 & -2 & & 2 & & -2 & & 1 \\
2 & & -2 & & 2 & & -2 & 1 \\
-2 & & 2 & & -2 & & 2 & -1 \\
2 & & -2 & 2 & -2 & & 2 & -1 \\
-2 & & 2 & -2 & 2 & & -2 & 1 \\
2 & -2 & 2 & & -2 & 2 & -2 & 1 \\
-2 & 2 & -2 & & 2 & -2 & 2 & -1 \\
2 & -2 & 2 & -2 & 2 & -2 & 2 & -1 \\
-2 & 2 & -2 & 2 & -2 & 2 & -2 & 1
\end{bmatrix}$$

FIG. 7

SINE TRANSFORM $$b(s1)=\frac{1}{\pi f}\left[1-\cos\left(\pi f\frac{8T}{8}\right)\right]$$

$$b(s2)=\frac{1}{\pi f}\left[1-2\cos\left(\pi f\frac{4T}{8}\right)+\cos\left(\pi f\frac{8T}{8}\right)\right]$$

$$b(s3)=\frac{1}{\pi f}\left[1-2\cos\left(\pi f\frac{2T}{8}\right)+2\cos\left(\pi f\frac{6T}{8}\right)-\cos\left(\pi f\frac{8T}{8}\right)\right]$$

$$b(s4)=\frac{1}{\pi f}\left[1-2\cos\left(\pi f\frac{2T}{8}\right)+2\cos\left(\pi f\frac{4T}{8}\right)-2\cos\left(\pi f\frac{6T}{8}\right)+\cos\left(\pi f\frac{8T}{8}\right)\right]$$

$$b(s5)=\frac{1}{\pi f}\left[1-2\cos\left(\pi f\frac{T}{8}\right)+2\cos\left(\pi f\frac{3T}{8}\right)-2\cos\left(\pi f\frac{5T}{8}\right)+2\cos\left(\pi f\frac{7T}{8}\right)-\cos\left(\pi f\frac{8T}{8}\right)\right]$$

$$b(s6)=\frac{1}{\pi f}\left[1-2\cos\left(\pi f\frac{T}{8}\right)+2\cos\left(\pi f\frac{3T}{8}\right)-2\cos\left(\pi f\frac{4T}{8}\right)+2\cos\left(\pi f\frac{5T}{8}\right)-2\cos\left(\pi f\frac{7T}{8}\right)+\cos\left(\pi f\frac{8T}{8}\right)\right]$$

$$b(s7)=\frac{1}{\pi f}\left[1-2\cos\left(\pi f\frac{T}{8}\right)+2\cos\left(\pi f\frac{2T}{8}\right)-2\cos\left(\pi f\frac{3T}{8}\right)+2\cos\left(\pi f\frac{5T}{8}\right)-2\cos\left(\pi f\frac{6T}{8}\right)+2\cos\left(\pi f\frac{7T}{8}\right)-\cos\left(\pi f\frac{8T}{8}\right)\right]$$

$$b(s8)=\frac{1}{\pi f}\left[1-2\cos\left(\pi f\frac{T}{8}\right)+2\cos\left(\pi f\frac{2T}{8}\right)-2\cos\left(\pi f\frac{3T}{8}\right)+2\cos\left(\pi f\frac{4T}{8}\right)-2\cos\left(\pi f\frac{5T}{8}\right)+2\cos\left(\pi f\frac{6T}{8}\right)-2\cos\left(\pi f\frac{7T}{8}\right)+\cos\left(\pi f\frac{8T}{8}\right)\right]$$

FIG. 9

COSINC ARRAY

| | | | | | | | |
|---|---|---|---|---|---|---|---|
| | | | | | | | -1 |
| | | | -2 | | | | 1 |
| | -2 | | | | 2 | | -1 |
| | -2 | | 2 | | -2 | | 1 |
| -2 | | 2 | | -2 | | 2 | -1 |
| -2 | | 2 | -2 | 2 | | -2 | 1 |
| -2 | 2 | -2 | | 2 | -2 | 2 | -1 |
| -2 | 2 | -2 | 2 | -2 | 2 | -2 | 1 |

FIG. 11

SINC MATRIX (UNFACTORED)

$$\begin{bmatrix}
 & & & & & & & & & & & & & & & \\
 & & & & & & & & & & & & -8 & -8 & 8 & 8 \\
 & & & & & & & & & & -8 & -8 & 8 & 8 & & \\
 & & & & & & & & -8 & -8 & 8 & 8 & & & & \\
 & & & & & & -8 & -8 & 8 & 8 & & & & & & \\
 & & & & -8 & -8 & 8 & 8 & & & & & & & & \\
 & & -8 & -8 & 8 & 8 & & & & & & & & & & \\
-8 & -8 & 8 & 8 & & & & & & & & & & & & \\
8 & 8 & & & & & & & & & & & & & & \\
8 & -8 & & & & & & & & & & & & & & \\
-8 & 8 & 8 & -8 & & & & & & & & & & & & \\
 & & -8 & 8 & 8 & -8 & & & & & & & & & & \\
 & & & & -8 & 8 & 8 & -8 & & & & & & & & \\
 & & & & & & -8 & 8 & 8 & -8 & & & & & & \\
 & & & & & & & & -8 & 8 & 8 & -8 & & & & \\
 & & & & & & & & & & -8 & 8 & 8 & -8 & & \\
 & & & & & & & & & & & & -8 & 8 & 8 & -8 \\
 & & & & & & & & & & & & & & & \\
\end{bmatrix}$$

SINC/COSINC TRANSFORM — A CONTINUOUS FOURIER TRANSFORM

Filed July 3, 1972 10 Sheets-Sheet 10